United States Patent
Kwak et al.

(10) Patent No.: US 11,082,170 B2
(45) Date of Patent: Aug. 3, 2021

(54) METHOD FOR TRANSMITTING AND RECEIVING DATA IN WIRELESS COMMUNICATION SYSTEM SUPPORTING SHORT TRANSMISSION TIME INTERVAL AND APPARATUS THEREFOR

(71) Applicant: LG ELECTRONICS INC., Seoul (KR)

(72) Inventors: Kyuhwan Kwak, Seoul (KR); Yunjung Yi, Seoul (KR); Daesung Hwang, Seoul (KR); Seungmin Lee, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 16/322,269

(22) PCT Filed: Aug. 14, 2017

(86) PCT No.: PCT/KR2017/008834
§ 371 (c)(1),
(2) Date: Jan. 31, 2019

(87) PCT Pub. No.: WO2018/030873
PCT Pub. Date: Feb. 15, 2018

(65) Prior Publication Data
US 2019/0173633 A1 Jun. 6, 2019

Related U.S. Application Data

(60) Provisional application No. 62/374,100, filed on Aug. 12, 2016.

(51) Int. Cl.
*H04L 5/00* (2006.01)
*H04W 72/04* (2009.01)
*H04W 72/12* (2009.01)
*H04W 72/14* (2009.01)
*H04W 74/00* (2009.01)

(52) U.S. Cl.
CPC ........... *H04L 5/0007* (2013.01); *H04L 5/00* (2013.01); *H04W 72/0446* (2013.01); *H04W 72/1268* (2013.01); *H04W 72/14* (2013.01); *H04W 74/002* (2013.01)

(58) Field of Classification Search
None
See application file for complete search history.

(56) References Cited

U.S. PATENT DOCUMENTS

2017/0026158 A1* 1/2017 Burstrom ............... H04B 7/024
2017/0055248 A1* 2/2017 Moon ................... H04L 1/0003
(Continued)

FOREIGN PATENT DOCUMENTS

WO 2016/072685 A2 5/2016

OTHER PUBLICATIONS

Huawei, Hisilicon, Discussion on UL scheduling timing for short TTI, Discussion on decision, Study on Latency reduction techniques for LTE, 3GPPTSG RAN WGI Meeting #85, R1-164064, May 23-27, 2016, Nanjing, China.
(Continued)

*Primary Examiner* — Bob A Phunkulh
(74) *Attorney, Agent, or Firm* — Dentons US LLP

(57) ABSTRACT

Disclosed are a method for transmitting and receiving data in a wireless communication system supporting a short transmission time interval (TTI) and an apparatus therefor. Specifically, the method may comprise the steps of: receiving a downlink control channel for which a first TTI is configured; and transmitting a specific uplink channel for which a second TTI is configured, on the basis of the received downlink control channel, wherein the first TTI and the second TTI are configured to have different lengths, the specific uplink channel is transmitted through a subframe after a specific processing time from the end point of a resource region allocated to the downlink control channel,
(Continued)

and the specific processing time is set according to at least one of a first processing time for the downlink control channel and a second processing time for the specific uplink control channel.

12 Claims, 9 Drawing Sheets

(56) References Cited

U.S. PATENT DOCUMENTS

| | | | |
|---|---|---|---|
| 2017/0290008 A1* | 10/2017 | Tooher | H04L 1/0007 |
| 2018/0077658 A1* | 3/2018 | Nory | H04W 52/346 |
| 2018/0077718 A1* | 3/2018 | Nory | H04L 1/1854 |
| 2018/0077719 A1* | 3/2018 | Nory | H04W 28/0278 |
| 2018/0132132 A1* | 5/2018 | Pan | H04W 28/06 |
| 2018/0332605 A1* | 11/2018 | Pelletier | H04W 72/1242 |

OTHER PUBLICATIONS

LG Electronics, Processing time reduction for latency reduction, Discussion on decision, LTE, 3GPP TSG RAN WGI Meeting #85, R1-164547, May 23-27, 2016, Nanjing, China.

Ericsson, Additional system level results for short TTI and different processing times, Discussion and decision, 3GPP TSG RAN WGI #85, R1-165303, May 23-27, 2016, Nanjing, P.R. China.

Intel Corporation, On the processing time reduction and maximum TA limitations, Discussion and decision, 3GPP TSG RAN WGI #85, R1-164163, May 23-27, 2016, Nanjing, China.

* cited by examiner

FIG. 4
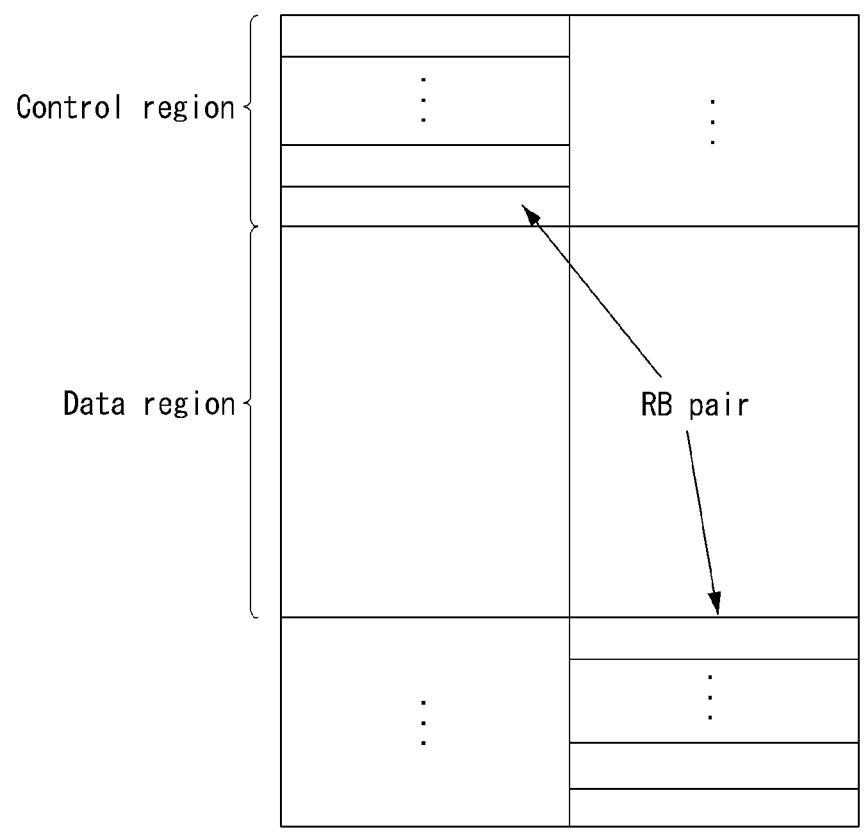
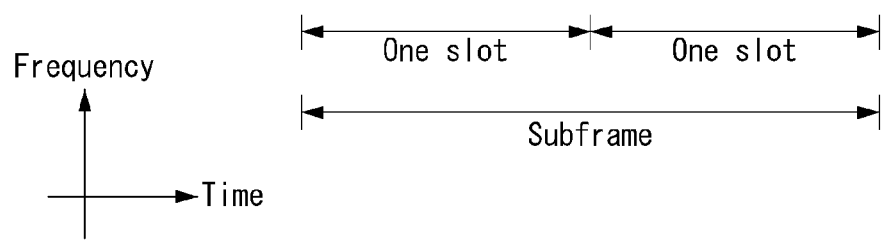

FIG. 7
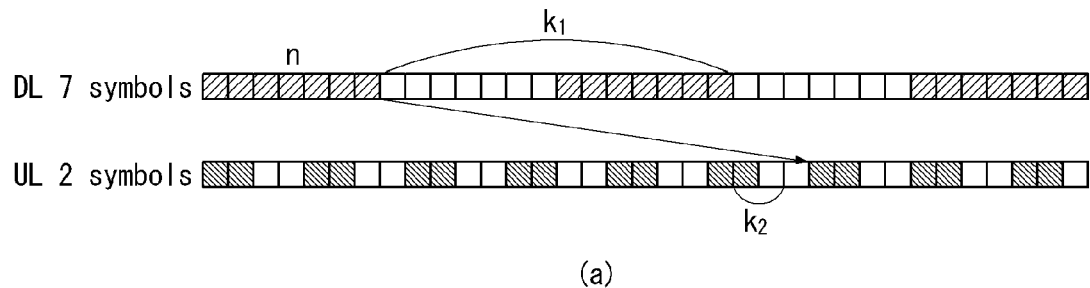
(a)
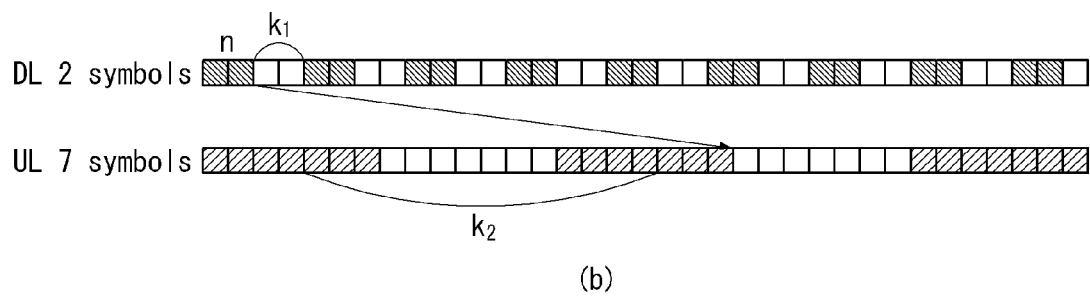
(b)
FIG. 8
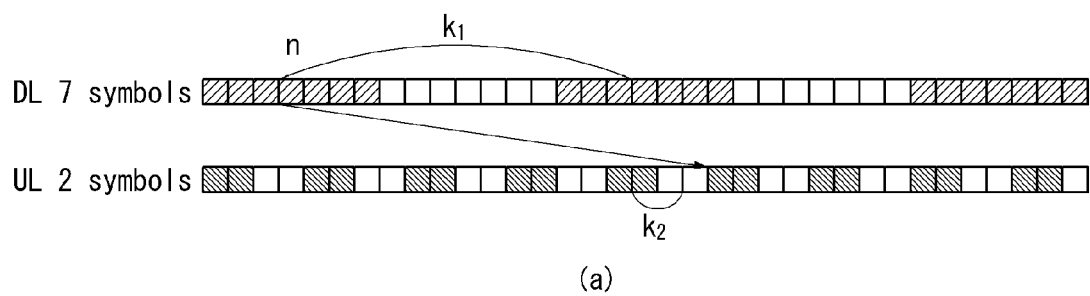
(a)
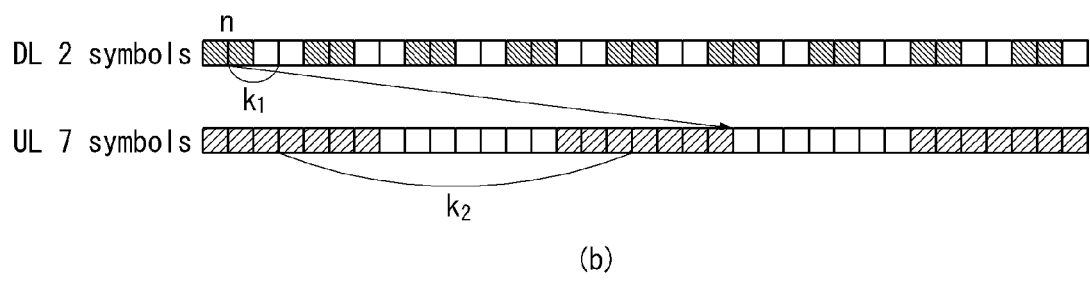
(b)

METHOD FOR TRANSMITTING AND RECEIVING DATA IN WIRELESS COMMUNICATION SYSTEM SUPPORTING SHORT TRANSMISSION TIME INTERVAL AND APPARATUS THEREFOR

CROSS-REFERENCE TO RELATED APPLICATIONS

This application is the National Stage filing under 35 U.S.C. 371 of International Application No. PCT/KR2017/008834, filed on Aug. 14, 2017, which claims the benefit of U.S. Provisional Application No. 62/374,100, filed on Aug. 12, 2016, the contents of which are all hereby incorporated by reference herein in their entirety.

TECHNICAL FIELD

The present invention relates to a wireless communication system supporting a short transmission time interval (TTI) and, more particularly, to a method for transmitting and receiving data using a hybrid automatic repeat request (HARQ) procedure and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

This specification proposes a method of transmitting and receiving feedback and/or data using an HARQ procedure in a wireless communication system supporting a short transmission time interval (TTI).

This specification proposes a method of configuring timing when a signal and/or a channel is transmitted and received in an HARQ procedure (e.g., DL HARQ procedure, UL HARQ procedure) if a TTI for uplink and a TTI for downlink are configured in different lengths (i.e., different numbers of symbols).

Furthermore, this specification proposes a method of configuring the processing time of a downlink channel based on a TTI for downlink and configuring the processing time of an uplink channel based on a TTI for uplink in relation to an HARQ procedure.

Furthermore, this specification proposes a method of configuring the transmission and reception timing of a signal and/or a channel by taking into consideration an additional processing time occurring when additional information is transmitted and received in relation to an HARQ procedure.

Technical objects to be achieved in the present invention are not limited to the above-described technical objects, and other technical objects not described above may be evidently understood by a person having ordinary skill in the art to which the present invention pertains from the following description.

Technical Solution

This specification proposes a method of transmitting and receiving data in a wireless communication system supporting a short transmission time interval (TTI). The method performed by the UE includes receiving a downlink control channel configured as a first TTI and transmitting a specific uplink channel configured as a second TTI based on the received downlink control channel. The first TTI and the second TTI are configured as TTIs of different lengths. The specific uplink channel is transmitted through a subframe after a specific processing time from timing when a resource region allocated to the downlink control channel is terminated. The specific processing time is configured based on at least one of a first processing time for the downlink control channel or a second processing time for the specific uplink control channel.

Furthermore, in the method of this specification, the first processing time may be configured based on the first TTI, and the second processing time may be configured based on the second TTI.

Furthermore, in the method of this specification, the first processing time may be configured as a multiple of a length unit of a downlink subframe configured according to the first TTI, and the second processing time may be configured as a multiple of a length unit of an uplink subframe configured according to the second TTI.

Furthermore, in the method of this specification, the first processing time and the second processing time may be configured in a symbol unit configuring the downlink subframe and the uplink subframe.

Furthermore, the method of this specification may further include receiving configuration information, related to at least one of the first processing time or the second processing time, through higher layer signaling.

Furthermore, in the method of this specification, the subframe may be a first uplink subframe generated after the specific processing time from the timing when the resource region allocated to the downlink control channel is terminated.

Furthermore, in the method of this specification, the specific processing time may be configured as the sum of the first processing time and the second processing time.

Furthermore, in the method of this specification, when the length of the first TTI is longer than the length of the second TTI, the specific processing time may be configured as a multiple of the first processing time.

Furthermore, in the method of this specification, when the length of the second TTI is longer than the length of the first TTI, the specific processing time may be configured as a multiple of the second processing time.

Furthermore, in the method of this specification, when the length of the first TTI is smaller than the length of the second TTI, the specific processing time may be configured as the sum of a multiple of the first processing time and a third processing time. The third processing time may be a processing time for uplink control information.

Furthermore, in the method of this specification, the first processing time may include the time necessary to receive and decode the downlink control channel. The second processing time may include the time necessary to encode the specific uplink control channel and the time corresponding to a margin of timing advance.

Furthermore, in the method of this specification, the specific uplink channel may include an uplink data channel for the transmission or retransmission of uplink data.

Furthermore, in a user equipment transmitting and receiving data in a wireless communication system supporting a short transmission time interval (TTI) of this specification, the user equipment includes a transceiver unit configured to transmit and receive radio signals and a processor functionally connected to the transceiver unit. The processor is configured to receive a downlink control channel (physical control channel) configured as a first TTI and to transmit a specific uplink channel configured as a second TTI based on the received downlink control channel. The first TTI and the second TTI are configured as TTIs of different lengths. The specific uplink channel is transmitted through a subframe after a specific processing time from timing when a resource region allocated to the downlink control channel is terminated. The specific processing time is configured based on at least one of a first processing time for the downlink control channel or a second processing time for the specific uplink control channel.

Furthermore, in the apparatus (i.e., user equipment) of this specification, the first processing time may be configured based on the first TTI, and the second processing time may be configured based on the second TTI.

Furthermore, in the apparatus of this specification, the processor may be configured to receive configuration information related to at least one of the first processing time or the second processing time, through higher layer signaling.

Advantageous Effects

In accordance with an embodiment of the present invention, if TTIs of different lengths (i.e., different numbers of symbols) are configured between downlink and uplink, the transmission and reception timing of a signal and/or a channel in an HARQ procedure can be optimized.

Specifically, in accordance with an embodiment of the present invention, if TTIs of different lengths are configured between downlink and uplink, unnecessary latency which may occur in the transmission and reception of a signal and/or a channel in an HARQ procedure can be prevented because timing configured based on the TTI of each link not a fixed timing relation (e.g., four subframes) is used.

Furthermore, in accordance with an embodiment of the present invention, unnecessary latency can be prevented because the transmission timing of UL data is configured by taking only a downlink control region into consideration.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

FIG. 4 illustrates the structure of an uplink subframe in a wireless communication system to which the present invention may be applied.

FIG. 7 shows examples of a method of configuring timing related to a DL HARQ procedure in a wireless communication system supporting a short transmission time interval (short TTI) to which a method proposed in this specification may be applied.

FIG. 8 shows examples of a method of configuring timing related to an UL HARQ procedure in a wireless communication system supporting a short transmission time interval to which a method proposed in this specification may be applied.

MODE FOR INVENTION

Figure 1:
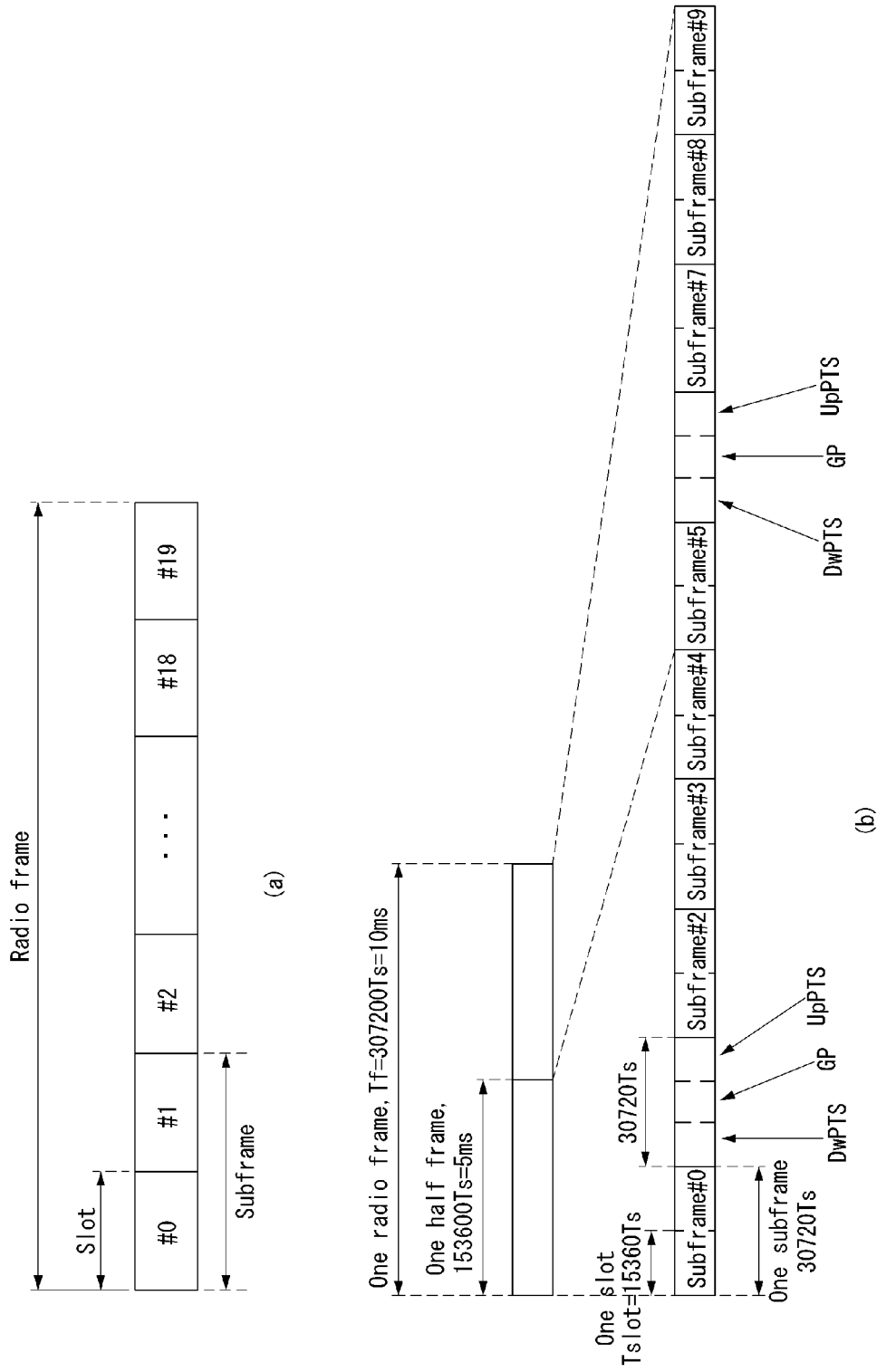
FIG. 1 illustrates the structure of a radio frame in a wireless communication system to which the present invention may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure. The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

The structure of the radio frame according to the example of FIG. 1 is only one example. The number of subcarriers included in one radio frame, the number of slots included in one subframe, and the number of OFDM symbols included in one slot may be changed in various manners.

Figure 2:
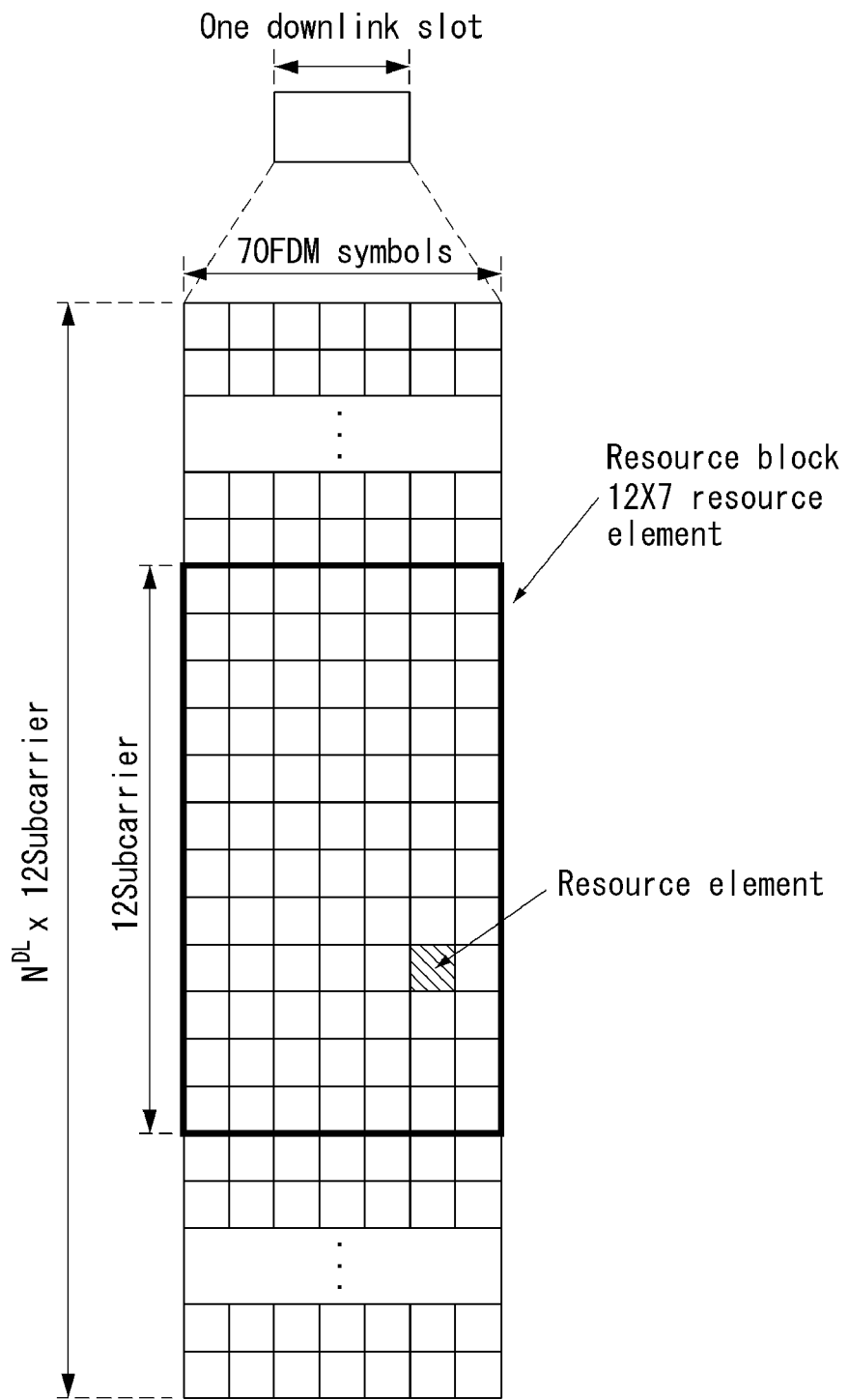
FIG. 2 is a diagram illustrating a resource grid for one downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
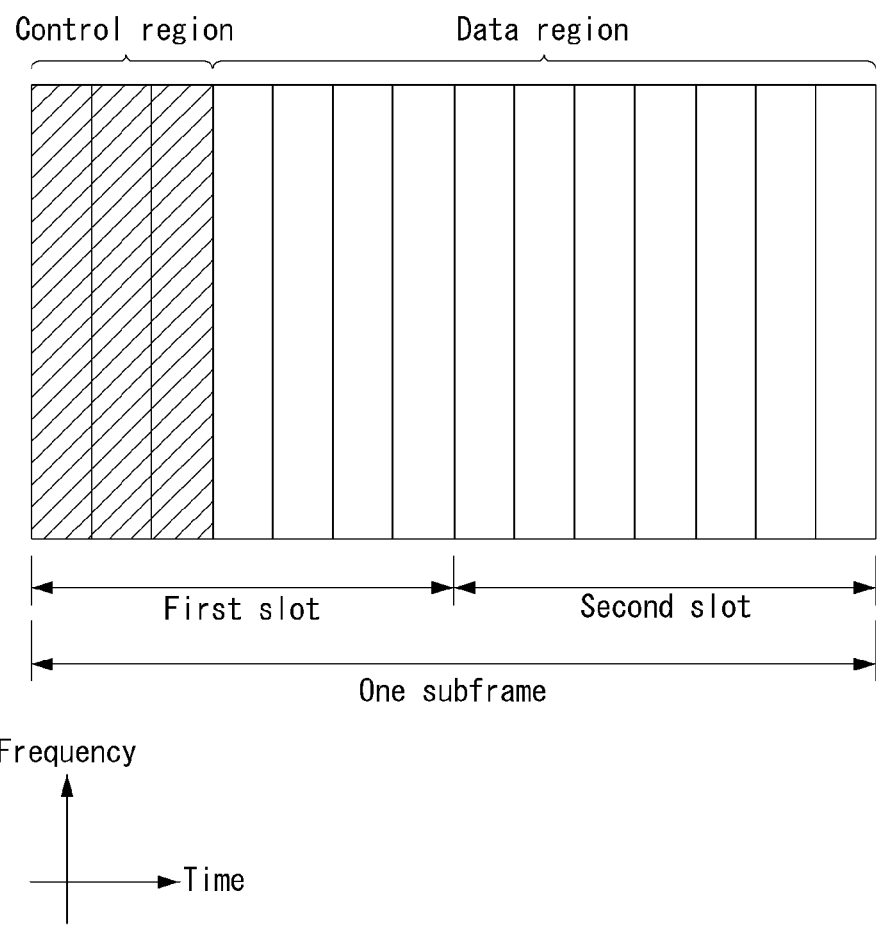
FIG. 3 illustrates the structure of a downlink subframe in a wireless communication system to which the present invention may be applied.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource alloca-

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | | Normal cyclic prefix in uplink | Extended cyclic prefix in uplink | | Normal cyclic prefix in uplink | Extended cyclic prefix in uplink |
| | DwPTS | | | DwPTS | | |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — | tion information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

HARQ Process

Today, LTE uses eight HARQ processes as a method for the error recovery of data, and defines the following two types of HARQs according to data retransmission timing.

Figure 5:
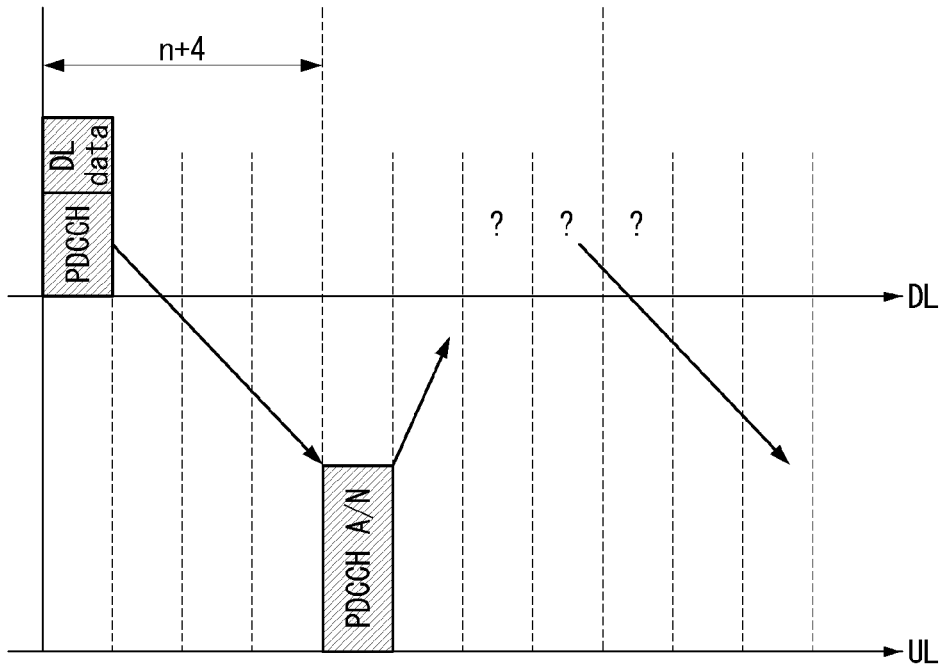
FIG. 5 is a diagram showing an example of an asynchronous HAQR operation in downlink.

FIG. 5 is a diagram showing an example of an asynchronous HAQR operation in downlink.

Referring to FIG. 5, a base station that has received NACK transmits retransmission data by configuring a new data indicator (NDI) within a DL grant (DCI format 1) as a bit indicating retransmission when it transmits the retransmission data. In this case, the base station indicates the retransmission for which data by including an HARQ process ID.

Figure 6:
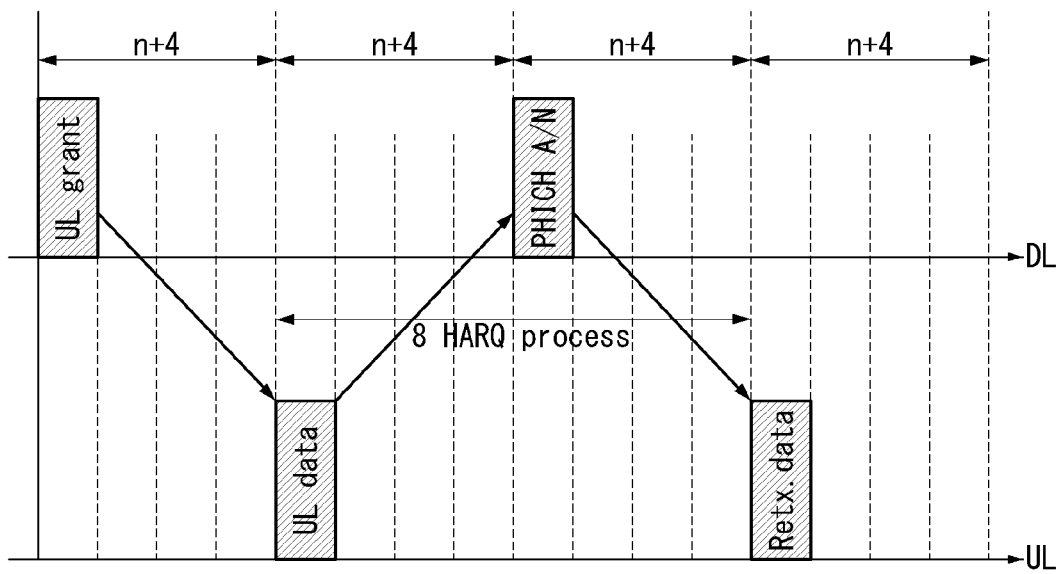
FIG. 6 is a diagram showing an example of a synchronous HAQR operation in uplink.

FIG. 6 is a diagram showing an example of a synchronous HAQR operation in uplink.

Referring to FIG. 6, a base station that has transmitted NACK transmits retransmission data using the same resource as initial data transmission in such a manner that the base station configures an NDI within an UL grant (DCI format 1) as a bit indicating retransmission and allocates a data resource for the retransmission as a new resource or omits an UL grant. In this case, retransmission timing is always fixed to a subframe after 4 ms after the NACK is received.

In the HARQ scheme, basically, error correction is attempted at a received code, and whether to perform retransmission is determined using a simple error detection code, such as cyclic redundancy check (CRC). With respect to retransmission, the HARQ scheme is basically divided into three types as follows. In LTE, an HARQ scheme through a CC (No. 2 scheme) or IR (No. 3 scheme) is performed.

1) Type-I HARQ Scheme: a reception stage discards an erroneous packet and makes a retransmission request. A transmission stage transmits the same packet as that of the first transmission. Accordingly, reliability improvement of a system and performance improvement through FEC can be achieved because an erroneous packet is discarded.

2) Type-I HARQ Scheme with Chase Combining: scheme using an erroneous packet in such a way as to combine the erroneous packet with a retransmitted packet without discarding the erroneous packet. Accordingly, an effect in that signal power is raised by combining several packets can be obtained.

3) Type-II HARQ Scheme (Incremental redundancy Scheme): scheme of using a code of a high coding rate in initial transmission and transmitting additional redundancy when retransmission occurs in order to prevent a case where a code of unnecessary high redundancy is transmitted upon initial transmission in the case of Type-I.

Known ACK/NACK Multiplexing Method

In the situation in which a user equipment has to transmit multiple ACK/NACKs, corresponding to multiple data units received from a base station, at the same time, in order to maintain the single-frequency property of an ACK/NACK signal and to reduce ACK/NACK transmit power, an ACK/NACK multiplexing method based on PUCCH resource selection may be taken into consideration.

The contents of ACK/NACK responses for multiple data units are identified by a combination of a PUCCH resource used for actual ACK/NACK transmission and the resource of QPSK modulation symbols along with ACK/NACK multiplexing.

For example, if one PUCCH resource transmits 4 bits and a maximum of four data units may be transmitted, ACK/NACK results may be identified in a base station as in Table 3.

TABLE 3

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 3, HARQ-ACK(i) indicates ACK/NACK results for an i-th data unit. In Table 3, discontinuous transmission (DTX) means that there is no data unit to be transmitted for corresponding HARQ-ACK(i) or a user equipment does not detect a data unit corresponding to HARQ-ACK(i).

According to Table 3, there are a maximum of four PUCCH resources $n_{PUCCH,0}^{(1)}$, $n_{PUCCH,1}^{(1)}$, $n_{PUCCH,2}^{(1)}$, and $n_{PUCCH,3}^{(1)}$, and b(0), b(1) is two bits transmitted using a selected PUCCH.

For example, when a user equipment successfully receives all of four data units, the user equipment transmits two bits (1,1) using $n_{PUCCH,1}^{(1)}$.

When a user equipment fails in decoding in first and third data units and is successful in decoding in second and fourth data units, the user equipment transmits a bit (1,0) using $n_{PUCCH,3}^{(1)}$.

In ACK/NACK channel selection, if at least one ACK is present, NACK and DTX are coupled. The reason for this is that all ACK/NACK states cannot be indicated by a combination of a reserved PUCCH resource and a QPSK symbol. If ACK is not present, however, DTX is decoupled from NACK.

In this case, a PUCCH resource linked to a data unit corresponding to one clear NACK may be reserved to transit a signal of multiple ACK/NACKs.

Physical HARQ Indication Channel (PHICH)

A PHICH is described below.

In an LTE system, one PHICH transmits only the PUSCH of one user equipment, that is, 1-bit ACK/NACK for a single stream, because single user-multiple input multiple output (SU-MIMO) is not supported in uplink.

The 1-bit ACK/NACK is coded into 3 bits using a repetition code having a code rate of 1/3. Three modulation symbols are generated by modulating the coded ACK/NACK using a binary phase key-shifting (BPKS) method. The modulation symbols are spread using a spreading factor (SF)=4 in a normal CP structure and using an SF=2 in an extended CP structure.

When the modulation symbols are spread, an orthogonal sequence is used. The number of orthogonal sequences used becomes SF*2 in order to apply I/Q multiplexing.

Spread PHICHs may be defined as one PHICH group using the SF*2 orthogonal sequences. Layer mapping is performed on the spread symbols. The layer-mapped symbols are mapped to a resource and transmitted.

The PHICH transmits HARQ ACK/NACK according to PUSCH transmission. A plurality of PHICHs mapped to the resource elements of the same set form a PHICH group. Each PHICH within the PHICH group is identified by a different orthogonal sequence. In the FDD system, $n_{PHICH}^{group}$, that is, the number of PHICH groups, is constant in all the subframes and may be determined by Equation 1.

$$N_{PHICH}^{group} = \begin{cases} \lceil N_g(N_{RB}^{DL}/8) \rceil, & \text{for normal cyclic prefix} \\ 2 \times \lceil N_g(N_{RB}^{DL}/8) \rceil, & \text{for extended cyclic prefix} \end{cases} \quad \text{[Equation 1]}$$

In Equation 1, $N_g$ is transmitted by higher layers through a physical broadcast channel (PBCH), and $N_g \in \{1/6, 1/2, 1, 2\}$. The PBCH carries system information that is essential for a user equipment to communicate with a base station. System information transmitted through the PBCH is called a master information block (MIB).

In contrast, system information transmitted through a physical downlink control channel (PDCCH) is called a system information block (SIB). $N_{RB}^{DL}$ is a downlink bandwidth configuration represented as a multiple of $N_{SC}^{RB}$, that is, the size of a resource block in the frequency domain. A PHICH group index $n_{PHICH}^{group}$ is any one integer of 0 to $n_{PHICH}^{group}-1$.

A resource used for a PHICH may be determined based on the smallest PRB index when the resource of a PUSCH is allocated and a cyclic shift (CS) value of a demodulation reference signal (DMRS) transmitted as an UL grant.

A resource to which a PHICH is mapped (hereinafter called a PHICH resource) may be represented as ($n_{PHICH}^{group}$, $n_{PHICH}^{seq}$) that is, an index pair. $n_{PHICH}^{group}$ indicates a PHICH group index, and $n_{PHICH}^{seq}$ indicates an orthogonal sequence index within the PHICH group. The ($n_{PHICH}^{group}$, $n_{PHICH}^{seq}$) may be determined by Equations 2 and 3 below.

$$n_{PHICH}^{group} = (I_{PRB_{RA}} + n_{DMRS}) \bmod N_{PHICH}^{group} + I_{PHICH} N_{PHICH}^{group}$$ [Equation 2]

$$n_{PHICH}^{seq} = (\lfloor I_{PRB\_RA}/N_{PHICH}^{group} \rfloor + n_{DMRS}) \bmod 2N_{SF}^{PHICH}$$ [Equation 3]

In this case, the nDMRS is mapped from a cyclic shift (CS) for a demodulation reference signal (DMRS) field in the most recent PDCCH having an uplink DCI format for a transport block related to corresponding PUSCH transmission.

In contrast, if a PDCCH having an UL DCI format for the same transport block is not present, when an initial PUSCH for the same transport block is semi-persistently scheduled or scheduled by a random access response grant signal, nDMRS is configured as 0.

$N_{SF}^{PHICH}$ indicates a spreading factor size used for PHICH modulation.

$I_{PRB\_RA}$ is the same as $I_{PRB\_RA}^{lowest\_index}$ in the case of the first transport block of a PUSCH related to a PDCCH or the number of transport blocks manually recognized when there is no related PDCCH is not the same as the number of transport blocks indicated in the most recent PDCCH related to a corresponding PUSCH.

In contrast, in the case of the second transport block of a PUSCH related to a PDCCH, $I_{PRB\_RA}$ is the same as $I_{PRB\_RA}^{lowest\_index}+1$. In this case, $I_{PRB\_RA}^{lowest\_index}$ corresponds to the lowest PRB index of the first slot of corresponding PUSCH transmission.

$n_{PHICH}^{group}$ indicates the number of a PHICH group configured by higher layers.

$I_{PHICH}$ has "1" when a PUSCH is transmitted in the subframe index 4 or 9 in the uplink-downlink configuration 0 of a TDD system, and has "0" otherwise.

Table 4 is a table showing a mapping relation between a cyclic shift for a DMRS field used to determine a PHICH resource in a PDCCH having an UL DCI format and an nDMRS.

TABLE 4

| Cyclic Shift for DMRS Field in PDCCH with uplink DCI format | nDMRS |
|---|---|
| 000 | 0 |
| 001 | 1 |
| 010 | 2 |
| 011 | 3 |
| 100 | 4 |
| 101 | 5 |
| 110 | 6 |
| 111 | 7 |

In a next-generation communication system, a method(s) for reducing a latency time that may occur when information is exchanged is taken into consideration. In this case, in order to reduce a transmission time interval (TTI) compared to the existing LTE (i.e., legacy LTE), a structure supporting a short TTI (shortened TTI, sTTI) may be taken into consideration.

In this case, a TTI for uplink (UL) and a TTI for downlink (DL) may be differently configured. For example, if TTI structures supported in a next-generation communication system are TTI structures configured with two, three, seven OFDM symbols, uplink may be configured based on the 7 symbol TTI structure (i.e., a TTI structure configured with 7 OFDM symbols), and downlink may be configured based on the 2 symbol TTI structure.

In this case, procedures performed in legacy LTE needs to be newly defined because a TTI for uplink and/or downlink is differently configured compared to legacy LTE. For example, in relation to a hybrid automatic repeat request (HARQ) procedure introduced for the transmission and reception of reliable information, HARQ timing needs to be newly defined. In this case, the HARQ timing may mean timing when a base station (eNodeB, eNB) and/or a user equipment (UE, terminal) transmit and receive a signal and/or a channel in relation to the HARQ procedure.

The HARQ procedure may mean a process for a reception stage to feed whether it has successfully decoded received data back to the transmission stage of the data. In this case, the HARQ procedure may be divided into a downlink (DL) HARQ procedure indicating a feedback procedure for DL data and an uplink (UL) HARQ procedure indicating a feedback procedure for UL data.

For example, the DL HARQ procedure may mean a process (for a user equipment) to feed whether data received through downlink (DL) has been successfully received back (to a base station) through uplink (UL). Specifically, the user equipment may receive and decode a PDCCH, may identify a DL resource region in which data (i.e., DL data) transmitted thereto is located, and may decode the data (i.e., DL data) in a corresponding area (i.e., the identified DL resource region) within a received PDSCH. Thereafter, the user equipment may transmit ACK/NACK for the data through a PUCCH.

For another example, the UL HARQ procedure may mean a process for a base station to feed whether data received through uplink (UL) has been successfully received back to a user equipment through downlink (DL). Specifically, the user equipment may receive and decode an UL grant from the base station, and may transmit data (i.e., UL data) to the base station through a PUSCH according to the UL grant. The base station may transmit ACK/NACK for the data through a PHICH and/or a PDCCH. In this case, when the base station transmits NACK, the user equipment may perform retransmission on the data.

In a legacy LTE system, the lengths of transmission time intervals (TTIs) used for uplink and downlink are identically configured based on frequency division duplex (FDD). Accordingly, the value of a time taken (or required) for the HARQ procedure may be calculated as the same TTI length unit with respect to the downlink and uplink. That is, in the HARQ procedure, the time taken to receive and decode a PDCCH and PDSCH, the time taken to encode a PUCCH and PUSCH, the margin value of timing advance (TA), etc. may be calculated as the same TTI length unit. In this case, a TTI length in legacy LTE may correspond to a subframe unit. The values may be calculated as a subframe unit (e.g., four subframes).

For example, in legacy LTE, if the index of a subframe in which DL data has been received is n (i.e., if the DL data is received in the subframe #n), a user equipment may be configured to transmit UL ACK/NACK feedback in a subframe #n+4. In this case, the UL ACK/NACK feedback may mean ACK/NACK feedback transmitted through uplink. Furthermore, in an UL HARQ procedure, if UL data has been received in a subframe #n, a base station may be configured to transmit DL ACK/NACK feedback in a subframe #n+4. In this case, the DL ACK/NACK feedback may mean ACK/NACK feedback transmitted through downlink. Furthermore, if a user equipment has received DL NACK feedback in a subframe #n from a base station, the user equipment may be configured to perform retransmission for UL data in a subframe #n+4.

That is, in legacy LTE, in relation to an HARQ procedure, a fixed timing relation (e.g., the relation between a subframe #n and a subframe #n+4) has been configured between the reception of data (or transmission in the case of data retransmission) and ACK/NACK feedback. In this case, there may be a difference between timing when a base station and/or a user equipment actually receives and decodes data and timing when ACK/NACK is actually transmitted. That is, unnecessary latency may occur in the HARQ procedure due to a fixed timing relation.

Furthermore, as described above, in legacy LTE, the time taken for an UL operation (e.g., the time taken to encode a PUCCH and PUSCH and the margin value of timing advance (TA)) and the time taken for a DL operation (e.g., time taken to receive and decode a PDCCH and PDSCH) have been configured based on the same TTI. The reason for this is that in legacy LTE, a TTI for downlink and a TTI for uplink have been identically configured. Accordingly, the existing method used in legacy LTE is difficult to apply to a case where TTIs of different lengths (or subframe that may correspond to a TTI) have been configured with respect to uplink and downlink in a wireless communication system supporting a short TTI (i.e., sTTI).

If TTIs of different lengths have been configured with respect to uplink and downlink, the time taken (or required) for a specific operation may be differently configured with respect to the uplink and downlink based on the TTI. Accordingly, a method of differently configuring the time taken for an uplink operation and the time taken for a downlink operation may be efficient in the latency aspect.

Hereinafter, this specification proposes an efficient method of configuring HARQ timing if TTIs of different lengths (i.e., different TTIs) have been configured with respect to uplink and downlink. Specifically, hereinafter, a method of configuring HARQ timing is described by taking into consideration the length of a TTI configured with respect to uplink and the length of a TTI configured with respect to downlink.

In this specification, a downlink control channel and a downlink data channel may be referred to as a physical downlink control channel (PDCCH) and a physical downlink shared channel (PDSCH), respectively. An uplink control channel and an uplink data channel may be referred to as a physical uplink control channel (PUCCH) and a physical uplink shared channel (PUSCH), respectively. Furthermore, in this specification, it is assumed that feedback (i.e., ACK/NACK feedback) for DL data transmission is transmitted through a PUCCH and feedback for UL data transmission is transmitted through a physical hybrid ARQ indication channel (PHICH) and/or a PDCCH.

Furthermore, a timing configuration method described in this specification hereinafter is described with respect to an HARQ procedure, but is not limited to be used for only the HARQ procedure. That is, a method described in this specification hereinafter may be applied to a timing configuration necessary for other procedure in addition to an HARQ procedure used in a wireless communication system supporting a sTTI.

Furthermore, the following embodiments have been divided for convenience of description, and some configurations or characteristics of one embodiment may be included in the other embodiment or may be substituted with corresponding configurations or characteristics of the other embodiment. For example, a method descried in a second embodiment may be additionally applied to a method described in a first embodiment and vice versa.

First Embodiment—Timing Configuration in DL HARQ Procedure

First, a method of configuring (or determining) the transmission and reception timing of a signal and/or a channel by taking into consideration a TTI configured for uplink (i.e., UL TTI) and a TTI configured for downlink (i.e., DL TTI) in a DL HARQ procedure is described. In this case, the UL TTI means the transmission time interval of a signal and/or a channel in uplink and may also be referred to as an UL subframe. Furthermore, the DL TTI means the transmission time interval of a signal and/or a channel in downlink and may also be referred to as a DL subframe.

In this case, a process of receiving a PDCCH and/or PDSCH in downlink and decoding it may be determined based on the DL TTI. A process of transmitting feedback for DL data through a PUCCH may be determined based on the UL TTI. That is, in a DL HARQ procedure, the time necessary for a user equipment to identify a DL resource region configured with respect to DL data through a PDCCH and to obtain the DL data through a PDSCH may be configured based on a DL TTI. Furthermore, likewise, in a DL HARQ procedure, the time necessary for a user equipment to encode a related PUCCH for the DL data and/or the margin value of timing advance (TA) may be configured based on an UL TTI.

FIG. 7 shows examples of a method of configuring timing related to a DL HARQ procedure in a wireless communication system supporting a short transmission time interval (short TTI) to which a method proposed in this specification may be applied. FIG. 7 is merely for convenience of description and does not limit the range of the invention.

Referring to FIG. 7, FIG. 7(a) shows a case where a DL TTI is configured to be longer than an UL TTI, and FIG. 7(b) shows a case where a DL TTI is configured to be shorter than an UL TTI. For example, in FIG. 7(a), it is assumed that the DL TTI is configured with seven symbols and the UL TTI (i.e., UL TTI) is configured with two symbols. Furthermore, in FIG. 7(b), it is assumed that the DL TTI is configured with two symbols and the UL TTI is configured with seven symbols.

Furthermore, in FIG. 7, regions colored with respect to downlink and uplink are for distinguishing between TTI units in each link, and do not limit the range of the invention.

In FIG. 7, $k_1$ may correspond to (may be called) the time necessary for a user equipment to receive a PDCCH and/or a PDSCH and to decode it (i.e., the time necessary to obtain DL data. Furthermore, $k_2$ may correspond to the time necessary for a user equipment to encode a PUCCH for transmitting feedback for DL data and time corresponding to a TA margin.

In this case, the $k_1$ and/or $k_2$ may be absolute times (e.g., time configured in a symbol unit, time configured in a us unit, time configured in a ms unit) or may be represented as a multiple of a TTI (i.e., subframe) length unit in downlink and uplink. Alternatively, the $k_1$ and/or $k_2$ may be a unit newly configured for the process calculation of uplink and/or downlink. Hereinafter, in this specification, for convenience of description, it is assumed that $k_1$ and/or $k_2$ has been configured as a multiple of a TTI (i.e., the subframe) length unit.

A case where a user equipment receives DL data in a subframe #n of downlink (i.e., based on downlink) may be assumed. That is, a case where the user equipment receives DL data, transmitted by a base station, in the DL subframe #n may be assumed. In this case, the user equipment may be configured to transmit feedback (i.e., UL feedback) for corresponding DL data in a corresponding UL subframe (or the first UL subframe that may be transmitted after corresponding timing) at timing spaced apart from the subframe #n of the downlink as much as $k_1+k_2$ (i.e., a processing time for downlink (specifically, downlink channel) and a processing time for uplink (specifically, an uplink channel)).

For example, as in FIG. 7(a), $k_1$ may be configured as 2 (i.e., two UL subframes), and $k_2$ may be configured as 1 (i.e., one UL subframe). In the case of a DL HARQ procedure, timing when $k_1+k_2$ is applied may be configured after a subframe #n, that is, the downlink control region (i.e., region in which downlink control channels are transmitted) and DL data region (i.e., region in which downlink data channels are transmitted) of the subframe #n.

In this case, configuration information on the $k_1$ and/or the $k_2$ may be delivered to a user equipment by a base station through higher layer signaling (e.g., RRC signaling, signaling through a MAC CE). Alternatively, configuration information on the $k_1$ and/or the $k_2$ (i.e., the value of $k_1$ and/or $k_2$) may be pre-configured based on a TTI (i.e., subframe) length unit of uplink and downlink within a system. For example, when a user equipment transmits, to a base station, capability information (e.g., decoding capability for a downlink channel, an encoding capability for an uplink channel) of the corresponding user equipment, the corresponding user equipment may receive configuration information indicating a specific $k_1$ value and specific $k_2$ value determined (or configured) by the corresponding base station.

Furthermore, if TTI units of uplink and downlink are differently configured, a method of converting n, $k_1$, and $k_2$ values into absolute times and determining HARQ timing may also be taken into consideration. If the values are converted into the absolute times, n, $k_1$, and $k_2$ may be calculated based on the length of a subframe (i.e., TTI) unit of a corresponding link (i.e., downlink or uplink).

In this case, as described above, timing when the value is converted into the absolute time (i.e., timing when $n+k_1+k_2$ is converted into the absolute time) may be delivered to a user equipment by a base station through higher layer signaling (e.g., RRC signaling, signaling through a MAC CE). Furthermore, if corresponding timing is present in a UL subframe unit not the boundary of an UL subframe (i.e., UL TTI), a user equipment may be configured to transmit UL feedback in a next (i.e., first transmittable) subframe after the corresponding timing.

The above-described contents may be identically applied to a case where a TTI configured with respect to uplink (i.e., UL TTI) is configured to be longer than a TTI configured with respect to downlink (i.e., DL TTI) as in FIG. 7(b).

Furthermore, the above-described contents have been described regarding a case where a user equipment transmits UL feedback to a base station, but the corresponding contents may be applied to a case where a base station transmits downlink feedback (i.e., DL feedback) to a user equipment (i.e., feedback in an UL HARQ procedure) identically or similarly. Specifically, a case where a base station receives UL data in a subframe #n of uplink (i.e., a case where the base station receives UL data transmitted in the UL subframe #n by a user equipment) may be assumed. In this case, the base station may be configured to transmit feedback for the corresponding UL data (i.e., DL feedback) in a corresponding UL subframe (or the first UL subframe transmittable after corresponding timing) at the timing spaced apart from the subframe #n of the uplink as much as $(k_1+k_2)$ (i.e., a processing time for the uplink and a processing time for downlink). In this case, the $k_1$ may mean the time necessary to receive and decode a PUCCH and PUSCH, and the $k_2$ may mean the time necessary to decode a PDCCH or PHICH for the DL feedback.

Second Embodiment—Timing Configuration in UL HARQ Procedure

Hereinafter, a method of configuring the transmission and reception timing of a signal and/or a channel by taking into consideration a TTI configured with respect to uplink (i.e., UL TTI) and a TTI configured with respect to downlink (i.e., DL TTI) in an UL HARQ procedure is described. In this case, in the above-described DL HARQ procedure, the method of configuring a processing time for downlink based on a DL TTI and configuring a processing time for uplink based on an UL TTI may be identically applied to an UL HARQ.

However, in relation to UL data transmission in an UL HARQ procedure, when a user equipment receives (and decodes) an UL grant transmitted through a PDCCH, the corresponding user equipment may identify a resource region for UL data and transmit the UL data. Furthermore, in relation to UL data retransmission (transmission) in an UL HARQ procedure, when a user equipment receives (and decodes) NACK for UL data transmitted through a PDCCH or PHICH, the corresponding user equipment may retransmit the UL data through the existing resource region for the UL data or a newly indicated resource region.

That is, in an UL HARQ procedure, a user equipment may identify (or receive, decode) only a control region (i.e., region in which a PDCCH, PHICH, etc. is transmitted) of downlink without a need to identify a data region (i.e., region in which a PDSCH, etc. is transmitted) of downlink, and may then transmit/retransmit UL data. In view of this point, in the case of an UL HARQ procedure, timing to which the above-described processing time (i.e., $k_1$ and $k_2$) of each link may be differently configured compared to a DL HARQ procedure.

FIG. 8 shows examples of a method of configuring timing related to an UL HARQ procedure in a wireless communication system supporting a short transmission time interval (short TTI) to which a method proposed in this specification may be applied. FIG. 8 is merely for convenience of description and does not limit the range of the invention.

Referring to FIG. 8, FIG. 8(a) shows a case where a downlink TTI (DL TTI) is configured to be longer than an UL TTI, and FIG. 8(b) shows a case where a DL TTI is configured to be shorter than an UL TTI. For example, in FIG. 8(a), a case where the DL TTI is configured with seven symbols and the UL TTI (i.e., UL TTI) is configured with two symbols is assumed. Furthermore, in FIG. 8(b), a case where the DL TTI is configured with two symbols and the UL TTI is configured with seven symbols is assumed. Furthermore, a case where a downlink control channel region is configured with three symbols in FIG. 8(a) and is configured with one symbol in FIG. 8(b) is assumed.

Furthermore, in FIG. 8, regions colored with respect to downlink and uplink are for distinguishing TTI units in each link, and do not limit the range of the invention.

In FIG. 8, $k_1$ may correspond to the time necessary for a user equipment to receive a PDCCH (or PHICH) and to decode it (e.g., time when an UL data transmission resource region is identified, time necessary to decode DL feedback). Furthermore, $k_2$ may correspond to the time necessary for a user equipment to encode a PUSCH for transmitting (or retransmitting) UL data and time corresponding to a TA margin.

As in FIG. 7, the $k_1$ and/or $k_2$ may be an absolute time (e.g., time configured in a symbol unit, time configured in a us unit, time configured in a ms unit) or may be represented as a multiple of a TTI (i.e., subframe) length unit in downlink and uplink. Alternatively, the $k_1$ and/or $k_2$ may be a unit newly configured for a processing calculation of uplink and/or downlink. Hereinafter, in this specification, for convenience of description, a case where $k_1$ and/or $k_2$ has been configured as a multiple of a TTI (i.e., subframe) length unit is assumed.

In this case, as described above, in an UL HARQ procedure, a user equipment may perform PUSCH (i.e., UL data) transmission right after it receives and decodes a PDCCH (or PHICH). Accordingly, timing when the $k_1$ and $k_2$ are applied may be configured within a subframe #n of downlink. Even in an UL HARQ, timing when the $k_1$ and $k_2$ are applied may be configured as the end timing of the subframe #n.

In this case, an accurate start position of the $k_1$ may be configured as timing when a symbol interval (i.e., a downlink control channel region) allocated to the PDCCH (or PHICH) configured in a system is ended. That is, at the above-described $(n+k_1+k_2)$ timing, the n may be substituted with "(n−1)+the number of symbols allocated to the PDCCH (or PHICH)." In other words, $(k_1+k_2)$ in which a processing time in each link is taken into consideration may be applied after the number of symbols corresponding to a downlink control region configured in a system from timing when a subframe #n−1 is terminated. Furthermore, the timing may be calculated by converting it into an absolute time as described above.

Furthermore, even in this case, configuration information on the $k_1$ and/or the $k_2$ may be delivered to a user equipment by a base station through higher layer signaling (e.g., RRC signaling, signaling through a MAC CE). Alternatively, configuration information on the $k_1$ and/or the $k_2$ (i.e., the value of $k_1$ and/or $k_2$) may be pre-configured based on a TTI (i.e., subframe) length unit of uplink and downlink within a system. For example, when a user equipment transmits, to a base station, capability information (e.g., decoding capability for a downlink channel, an encoding capability for an uplink channel) of the corresponding user equipment, the corresponding user equipment may receive configuration information indicating a specific $k_1$ value and specific $k_2$ value determined (or configured) by the corresponding base station.

Furthermore, the configuration information on the number of symbols allocated to the PDCCH (or PHICH) may be delivered to a user equipment by a base station (in a cell-specific manner). In this case, the configuration information may be delivered through higher layer signaling, etc.

Like the above-described method, the method of transmitting UL data after only a downlink control channel region is received and decoded has an advantage in that the transmission of a signal and/or a channel can be optimized by reducing unnecessary latency compared to the existing method using a fixed timing relation (e.g., four subframes).

Furthermore, in various embodiments of the present invention, if the $k_1$ and the $k_2$ are configured as different values, a method of configuring timing based on a larger or smaller value of the values may be taken into consideration.

For example, as in FIG. 7(a), when $k_1$ is greater than $k_2$ (e.g., if a DL TTI is configured to be longer than an UL TTI and a corresponding processing time is also configured to be long), a user equipment may be configured to transmit UL feedback in an UL subframe corresponding to $(n+k_1+k_1)$ timing (or the first UL subframe that may be transmitted after the corresponding timing). Alternatively, a user equipment may be configured to transmit UL feedback at $(n+k_1+1)$ timing. In this case, the "1" may be converted into an absolute time by applying the subframe unit length (i.e., TTI unit length) of a link to which $k_1$ corresponds (e.g., downlink in the case of FIGS. 7(a) and 8(a)).

More specifically, the method may be configured in various manners as in the following examples depending on a DL HARQ procedure or an UL HARQ procedure and/or the great or small of a DL TTI and an UL TTI.

First, in a DL HARQ procedure, methods of configuring the method based on the large or small relation between a DL TTI and an UL TTI include the following examples.

For example, in a DL HARQ procedure, if a DL TTI is configured to be longer than an UL TTI, a user equipment may be configured to transmit UL feedback at $(n+k_1+k_1)$ timing or $(n+k_1+1)$ timing. In this case, the "1" may be converted into an absolute time by applying the subframe unit length (i.e., TTI unit length) of a link to which the $k_1$ corresponds (e.g., downlink in the case of FIGS. 7(a) and 8(a)).

For another example, in a DL HARQ procedure, if an UL TTI is configured to be longer than a DL TTI, a user equipment may be configured to transmit UL feedback at $(n+k_1+k_1)$ timing. However, if the UL feedback (i.e., UL ACK/NACK feedback) is fed back along with other uplink control information (UCI) (e.g., channel state information (CSI)), an addition time for the encoding, etc. of the other uplink control information may be necessary.

Figure 9:
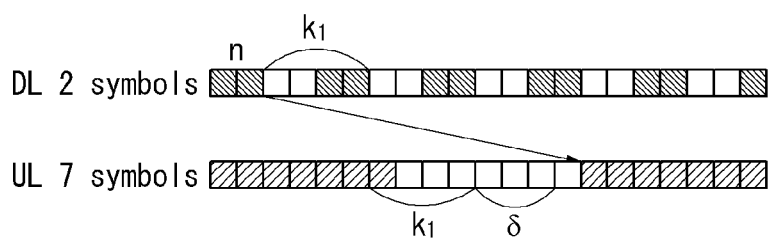
FIG. 9 shows an example of a method of configuring timing related to a DL HARQ procedure and/or uplink control information in a wireless communication system supporting a short transmission time interval to which a method proposed in this specification may be applied.

FIG. 9 shows an example of a method of configuring timing related to a DL HARQ procedure and/or uplink control information in a wireless communication system supporting a short transmission time interval to which a method proposed in this specification may be applied. FIG. 9 is merely for convenience of description and does not limit the range of the invention.

Referring to FIG. 9, a case where an UL TTI is configured to be longer than a DL TTI and a user equipment feeds back (or transmits) uplink control information (UCI) along with feedback for DL data is assumed. For example, as in FIG. 9, an UL TTI may be configured with seven symbols, and a DL TTI may be configured with two symbols. Furthermore, a case where a processing time for downlink and a processing time for uplink are configured based on a DL TTI (i.e., UL subframe unit) is assumed. That is, in FIG. 9, both the processing time for downlink and the processing time for uplink are configured as $k_1$.

In this case, time necessary for the feedback (or transmission) of uplink control information may correspond to (or may be called) δ. The value of δ may be differently configured depending on the type (or kind) of uplink control information. In this case, a user equipment may be configured to transmit UL feedback in an UL subframe corresponding to $(n+k_1+k_1+\delta)$ timing (or the first UL subframe that may be transmitted after the corresponding timing) by taking the value of δ into consideration.

In this case, the value of δ may be a value configured as an absolute time (e.g., time configured in a symbol unit, time configured in a us unit, time configured in a ms unit), or may be configured as a multiple of an UL TTI (i.e., a subframe length unit of UL. Alternatively, the value of δ may be represented as a unit newly configured in order to calculate time taken (or necessary) for the encoding, etc. of uplink in a system.

In this case, the δ value may be delivered to a user equipment by a base station through higher layer signaling, etc. For example, when a user equipment transmits capability information (e.g., a decoding capability for a downlink channel, an encoding capability for an uplink channel) of the corresponding user equipment to a base station, the corresponding user equipment may receive (or obtain) configuration information indicating a specific δ value determined (or configured) by the corresponding base station. Alternatively, the δ value may be a value pre-configured based on an UL TTI (i.e., UL subframe length unit) and/or DL TTI (i.e., UL subframe length unit) in a system. If $k_1$ and δ are not configured as absolute times, such as a multiple of a TTI (i.e., a multiple of a subframe length unit), the transmission timing (i.e., $(n+k_1+k_1+δ)$ timing) of corresponding feedback may be configured by converting the $k_1$ and δ into absolute times.

Furthermore, a δ value according to the transmission of uplink control information may be applied using a similar method even in an UL HARQ procedure. For example, if the transmission of UL data is performed at specific timing after information of resource allocation, etc. for the transmission of the UL data transmitted through a downlink control channel is decoded, a user equipment may transmit an uplink data channel by additionally taking into consideration an additional processing time δ of encoding, etc. necessary for the UL data transmission.

In contrast, in an UL HARQ procedure, methods of configuring the method based on the large or small relation between a DL TTI and an UL TTI include the following examples. As described above, in the case of an UL HARQ procedure, when a user equipment receives a downlink control channel region (i.e., PDCCH region), decodes it and identifies an uplink data channel region allocated thereto (i.e., PUSCH region), the corresponding user equipment may be configured to immediately encode data (i.e., UL data) and perform PUSCH transmission without waiting for the period in which the user equipment receives and decodes the remaining downlink data channel region (i.e., PDSCH region).

For example, in an UL HARQ procedure, if an UL TTI is configured to be longer than a DL TTI, a PDCCH region may be configured to be very small compared to the UL TTI. Accordingly, a user equipment encodes a PUSCH, and the UL data transmission timing of the user equipment may be configured based on time necessary to configure a TA margin value.

Figure 10:
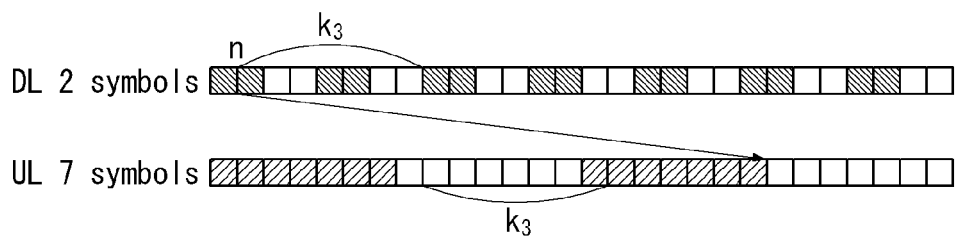
FIG. 10 shows another example of a method of configuring timing related to an UL HARQ procedure in a wireless communication system supporting a short transmission time interval to which a method proposed in this specification may be applied.

FIG. 10 shows another example of a method of configuring timing related to an UL HARQ procedure in a wireless communication system supporting a short transmission time interval to which a method proposed in this specification may be applied. FIG. 10 is merely for convenience of description and does not limit the range of the invention 아니다.

Referring to FIG. 10, a case where an UL TTI is configured to be longer than a DL TTI (e.g., a case where the UL TTI is configured with seven symbols and the DL TTI is configured with two symbols) and a processing time for downlink and a processing time for uplink are configured based on the UL TTI (i.e., UL subframe unit) are assumed. Furthermore, a case where a user equipment receives a downlink control channel and downlink data channel in a subframe #n of downlink (i.e., a case where the user equipment receives a downlink channel transmitted by a base station in the DL subframe #n) is assumed.

In this case, the time necessary for the user equipment to encode a PUSCH (i.e., a channel in which UL data will be transmitted) and to configure a TA margin value may correspond to $k_3$. Accordingly, the user equipment may be configured to transmit UL data in an UL subframe (or the first UL subframe (i.e., a next UL subframe) that may be transmitted at corresponding timing if the corresponding timing is present within the UL subframe) corresponding to $(n+k_3+k_3)$ timing.

However, in the case of an UL HARQ procedure, a user equipment may start to prepare PUSCH transmission right after it decodes only a PDCCH (or PHICH). In the $(n+k_3+k_3)$ timing, the n may be substituted with "$(n-1)$+the number of symbols allocated to the PDCCH (or PHICH)." That is, as shown in FIG. 10, the user equipment may be configured to transmit (or retransmit) UL data at timing when $(k_3+k_3)$ is applied from the end timing of a downlink control region. In this case, the corresponding timing may be calculated by converting it into an absolute time.

In this case, configuration information of the $k_3$ may be delivered to the user equipment by the base station through higher layer signaling (e.g., RRC signaling, signaling through a MAC CE). Alternatively, the configuration information (i.e., the value of $k_3$) of the $k_3$ may be pre-configured based on TTI (i.e., subframe) length units of uplink and downlink within a system.

Furthermore, the $k_3$ may be configured as an absolute time (e.g., time configured in a symbol unit, time configured in a us unit, time configured in a ms unit) or may be represented as a multiple of a TTI (i.e., subframe) length unit in downlink and uplink. Alternatively, the $k_3$ may be a unit newly configured for the process calculation of uplink. If the $k_3$ is not configured as an absolute time, such as a multiple of a TTI (i.e., a multiple of a subframe length unit), the transmission timing of corresponding UL data (or feedback) may be configured by converting the $k_3$ into an absolute time.

Furthermore, configuration information for the number of symbols allocated to a PDCCH (or PHICH) may be delivered to the user equipment by the base station (in a cell-specific manner). In this case, the configuration information may be delivered through higher layer signaling, etc.

For another example, in an UL HARQ procedure, if a DL TTI is configured to be longer than an UL TTI, the processing time of each link may be configured based on the UL TTI (i.e., an UL subframe length unit). That is, a user equipment may be configured to transmit (or retransmit) UL data at $(k_2+k_2)$ timing from timing when the downlink control channel region of a DL subframe #n is terminated. In this case, as described above, the $k_2$ may mean the time necessary to transit a PUSCH (e.g., a PUSCH encoding time and time corresponding to a TA margin value).

However, in this case, an additional time (i.e., ε) may be necessary in relation to the reception and decoding of the corresponding region because the control channel region (i.e., PDCCH region) of downlink may be configured to be greater than the UL TTI.

Figure 11:
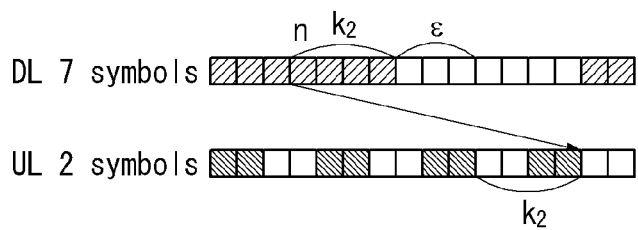
FIG. 11 shows yet another example of a method of configuring timing related to an UL HARQ procedure in a wireless communication system supporting a short transmission time interval to which a method proposed in this specification may be applied.

FIG. 11 shows yet another example of a method of configuring timing related to an UL HARQ procedure in a wireless communication system supporting a short transmission time interval to which a method proposed in this specification may be applied. FIG. 11 is merely for convenience of description and does not limit the range of the invention 아니다.

Referring to FIG. 11, a case where if a DL TTI is configured to be longer than an UL TTI, a processing time for downlink and a processing time for uplink are configured based on the UL TTI (i.e., UL subframe unit) is assumed. That is, in FIG. 11, both the processing time for downlink and the processing time for uplink are configured as $k_2$.

Furthermore, as described above, an additional time necessary in relation to the reception and decoding of a downlink control region (i.e., PDCCH region) may correspond to ε. Accordingly, a user equipment may be configured to transmit (or retransmit) UL data in an UL subframe (or the first UL subframe (i.e., a next UL subframe) that may be transmitted at corresponding timing if the corresponding timing is present within the UL subframe) corresponding to $(n+k_2+\varepsilon+k_2)$ timing. In this case, the ε may mean a processing time additionally necessary for additional information (e.g., ACK/NACK information of UL data, new resource allocation information for the retransmission of the UL data) that may be delivered in a downlink control region.

However, in the case of an UL HARQ procedure, a user equipment may start to prepare PUSCH transmission right after it decodes only a PDCCH (or PHICH). In the $(n+k_2+\varepsilon+k_2)$ timing, the n may be substituted with "(n−1)+the number of symbols allocated to the PDCCH (or PHICH)." That is, as shown in FIG. 11, a user equipment may be configured to transmit (or retransmit) UL data at timing when $(k_2+\varepsilon+k_2)$ is applied from the end timing of a downlink control region. In this case, the corresponding timing may be calculated by converting it into an absolute time (e.g., time configured in a symbol unit, time configured in a us unit, time configured in a ms unit).

In this case, configuration information of the $k_2$ (i.e., the value of $k_2$) may be delivered to the user equipment by a base station through higher layer signaling (e.g., RRC signaling, signaling through a MAC CE). Alternatively, the configuration information of the $k_2$ may be pre-configured based on a TTI (i.e., subframe) length unit of uplink and downlink within a system.

Furthermore, configuration information of the ε (i.e., the value of ε) may be delivered to the user equipment by the base station through higher layer signaling (e.g., RRC signaling, signaling through a MAC CE). Alternatively, the configuration information of the ε may be pre-configured based on a TTI (i.e., subframe) length unit of uplink and downlink within a system. Alternatively. the ε value may be calculated using an implicit method in a system. For example, the ε value may be configured as an upper bound natural number value, etc. of a "value obtained by dividing the number of symbols of a downlink control channel region by an UL TTI" in which the number of symbols of the downlink control channel region (e.g., the number of symbols of a PDCCH) has been taken into consideration.

Figure 12:
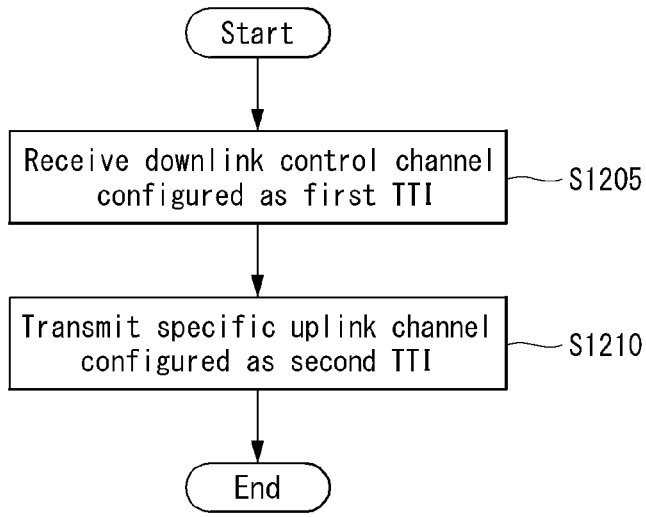
FIG. 12 shows a flowchart of a user equipment transmitting and receiving data in a wireless communication system supporting a short transmission time interval to which a method proposed in this specification may be applied.

FIG. 12 shows a flowchart of a user equipment transmitting and receiving data in a wireless communication system supporting a short transmission time interval to which a method proposed in this specification may be applied. FIG. 12 is merely for convenience of description and does not limit the range of the invention.

Referring to FIG. 12, a case where a TTI for downlink (e.g., first TTI) and a TTI for uplink (e.g., second TTI) are configured as different values is assumed. In this case, what the TTI is configured as a different value may mean that the number of symbols configuring the TTI is different.

At step S1205, the user equipment receives a downlink control channel configured as a first TTI. For example, as described in the first embodiment or the second embodiment, the downlink control channel may mean a PDCCH. Alternatively, the downlink control channel may mean a PHICH.

Thereafter, at step S1210, the user equipment transmits a specific uplink channel configured as a second TTI based on the received downlink control channel. In this case, the specific uplink channel may mean an uplink data channel (uplink shared channel) (e.g., PUSCH). In this case, the specific uplink channel is transmitted through a subframe after a specific processing time from timing when a resource region allocated to the downlink control channel (i.e., symbols corresponding to the downlink control channel) is terminated.

In this case, the specific processing time is configured based on at least one of a first processing time (e.g., $k_1$ described in the first embodiment and the second embodiment) for the downlink control channel or a second processing time (e.g., the $k_2$ described in the first embodiment and the second embodiment) for the specific uplink control channel. In this case, as described above, the first TTI and the second TTI are configured as TTIs of different lengths.

Furthermore, the first processing time may be configured based on the first TTI, and the second processing time may be configured based on the second TTI. That is, the processing time of each link may be configured based on a TTI unit configured with respect to each link. In this case, the first processing time may be configured as a multiple of a length unit of a DL subframe configured based on the first TTI, and the second processing time may be configured as a multiple of a length unit of a UL subframe configured based on the second TTI. Furthermore, in this case, the first processing time and the second processing time may be configured in a symbol unit configuring the DL subframe and the UL subframe.

Furthermore, the user equipment may receive configuration information related to at least one of the first processing time or the second processing time (from a base station) through higher layer signaling.

Furthermore, the subframe in which the specific uplink control channel is transmitted may be the first UL subframe generated after a specific processing time from timing when a resource region allocated to the downlink control channel is terminated.

Furthermore, the specific processing time may be configured as the sum of the first processing time and the second processing time or may be configured as a multiple of the first processing time or the second processing time (e.g., twice first processing time, twice second processing time). For example, when the length of the first TTI is longer than the length of the second TTI, the specific processing time may be configured as a multiple of the first processing time. In contrast, when the length of the second TTI is longer than the length of the first TTI, the specific processing time may be configured as a multiple of the second processing time. Alternatively, when the length of the first TTI is smaller than the length of the second TTI, the specific processing time may be configured as the sum of a multiple of the first processing time and a third processing time corresponding to the processing time (e.g., the above-described δ) of uplink control information (UCI).

Furthermore, the specific uplink channel may include an uplink data channel for the transmission or retransmission of uplink data. In this case, the downlink control channel may include information (i.e., UL grant) for allocating a resource region for the transmission of the uplink data or may include information indicating NACK feedback for previous uplink data.

General Apparatus to which the Present Invention May be Applied

Figure 13:
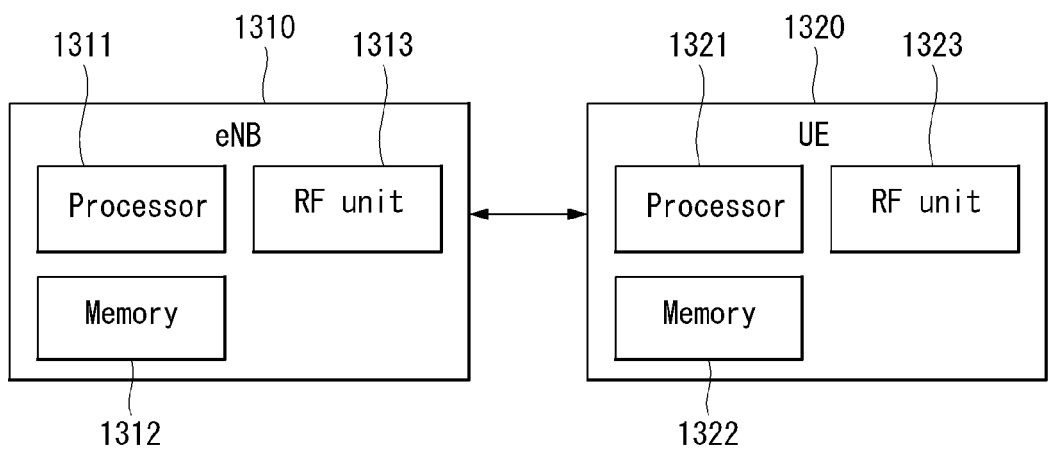
FIG. 13 illustrates a block diagram of a wireless communication device to which methods proposed in this specification may be applied.

FIG. 13 illustrates a block diagram of a wireless communication device to which methods proposed in this specification may be applied.

Referring to FIG. 13, the wireless communication system includes an eNB 1310 and multiple UEs 1320 located with the area of the eNB 1310.

The eNB 1310 includes a processor 1311, memory 1312 and a radio frequency (RF) unit 1313. The processor 1311 implements the functions, processes and/or methods proposed in FIGS. 1 to 12. The layers of a radio interface protocol may be implemented by the processor 1311. The memory 1312 is connected to the processor 1311 and stores a variety of types of information for driving the processor 1311. The RF unit 1313 is connected to the processor 1311 and transmits and/or receives radio signals.

The UE 1320 includes a processor 1321, memory 1322 and an RF unit 1323.

The processor 1321 implements the functions, processes and/or methods proposed in FIGS. 1 to 12. The layers of a radio interface protocol may be implemented by the processor 1321. The memory 1322 is connected to the processor 1321 and stores a variety of types of information for driving the processor 1321. The RF unit 1323 is connected to the processor 1321 and transmits and/or receives radio signals.

The memory 1312, 1322 may be positioned inside or outside the processor 1311, 1321 and may be connected to the processor 1311, 1321 by various well-known means. Furthermore, the eNB 1310 and/or the UE 1320 may have a single antenna or multiple antennas.

Figure 14:
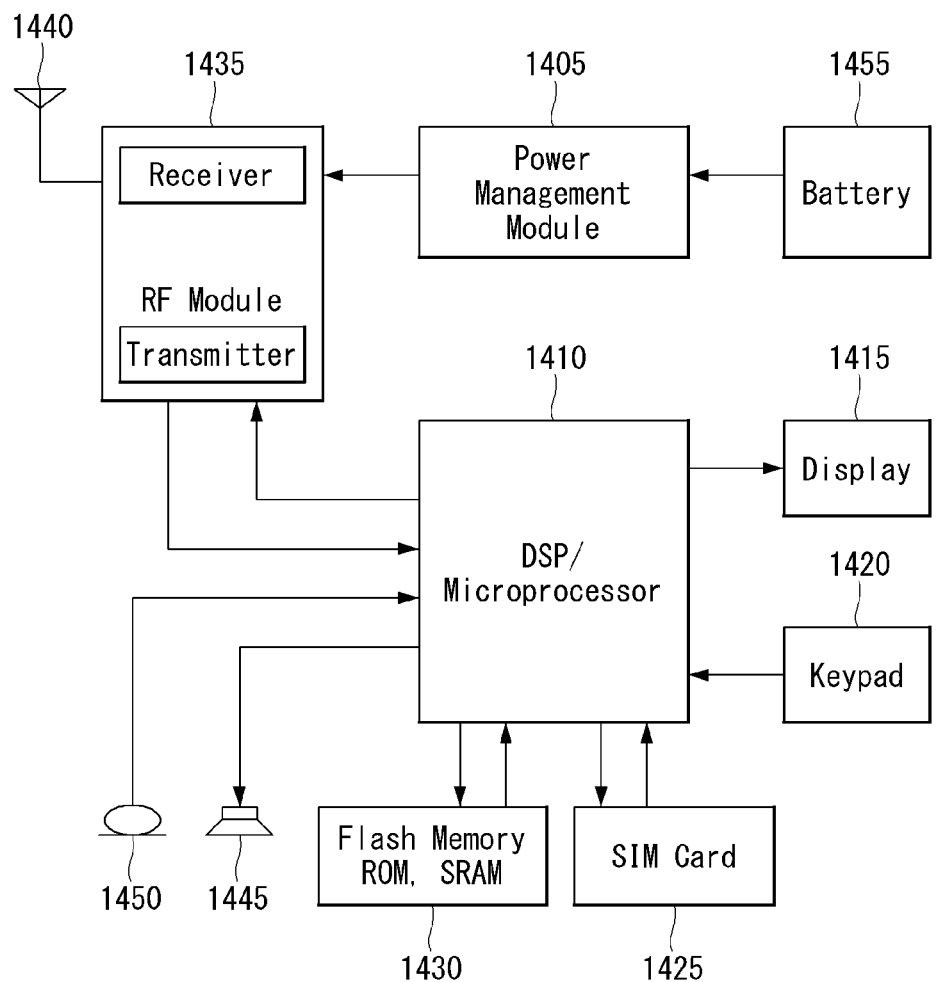
FIG. 14 illustrates a block diagram of a communication device according to an embodiment of the present invention.

FIG. 14 illustrates a block diagram of a communication device according to an embodiment of the present invention.

Specifically, FIG. 14 is a diagram illustrating the UE of FIG. 13 more specifically.

Referring to FIG. 14, the UE may include a processor (or digital signal processor (DSP)) 1410, an RF module (or RF unit) 1435, a power management module 1405, an antenna 1440, a battery 1455, a display 1415, a keypad 1420, a memory 1430, a subscriber identification module (SIM) card 1425 (this element is optional), a speaker 1445, and a microphone 1450. The UE may further include a single antenna or multiple antennas.

The processor 1410 implements the functions, processes and/or methods proposed in FIGS. 1 to 12. The layers of a radio interface protocol may be implemented by the processor.

The memory 1430 is connected to the processor 1410, and stores information related to the operation of the processor 1410. The memory may be positioned inside or outside the processor 1410 and may be connected to the processor 1410 by various well-known means.

A user inputs command information, such as a telephone number, by pressing (or touching) a button of the keypad 1420 or through voice activation using the microphone 1450, for example. The processor receives such command information and performs processing so that a proper function, such as making a phone call to the telephone number, is performed. Operational data may be extracted from the SIM card 1425 or the memory. Furthermore, the processor 1410 may recognize and display command information or driving information on the display 1415, for convenience sake.

The RF module 1435 is connected to the processor 1410 and transmits and/or receives RF signals. The processor delivers command information to the RF module 1435 so that the RF module 1435 transmits a radio signal that forms voice communication data, for example, in order to initiate communication. The RF module 1435 includes a receiver and a transmitter in order to receive and transmit radio signals. The antenna 1440 functions to transmit and receive radio signals. When a radio signal is received, the RF module 1435 delivers the radio signal so that it is processed by the processor 1410, and may convert the signal into a baseband. The processed signal may be converted into audible or readable information output through the speaker 1445.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The scheme for transmitting and receiving data in a wireless communication system supporting a short transmission time interval (short TTI) of the present invention has been illustrated as being chiefly applied to a 3GPP LTE/LTE-A system, but may be applied to various wireless communication systems in addition to the 3GPP LTE/LTE-A system.

The invention claimed is:

1. A method of transmitting and receiving data by a user equipment in a wireless communication system supporting a short transmission time interval (TTI), the method comprising:
   receiving a downlink control channel configured as a first TTI; and
   transmitting a specific uplink channel configured as a second TTI based on the received downlink control channel,
   wherein the first TTI and the second TTI are configured as TTIs of different lengths,
   wherein the specific uplink channel is transmitted through a subframe after a specific processing time from a time when a resource region allocated to the downlink control channel is terminated,
   wherein the specific processing time is configured based on at least one of a first processing time for the downlink control channel or a second processing time for the specific uplink control channel,
   wherein the first processing time is configured based on the first TTI,
   wherein the second processing time is configured based on the second TTI,
   wherein the first processing time is configured as a multiple of a length unit of a downlink subframe configured according to the first TTI, and
   the second processing time is configured as a multiple of a length unit of an uplink subframe configured according to the second TTI.

2. The method of claim 1, wherein the first processing time and the second processing time are configured in units of a number of symbols configuring the downlink subframe and the uplink subframe, respectively.

3. The method of claim 1, further comprising:
   receiving configuration information related to at least one of the first processing time or the second processing time, through higher layer signaling.

4. The method of claim 1, wherein the subframe is a first uplink subframe generated after the specific processing time from the time when the resource region allocated to the downlink control channel is terminated.

5. The method of claim 1, wherein the specific processing time is configured as a sum of the first processing time and the second processing time.

6. The method of claim 1, wherein when a length of the first TTI is longer than a length of the second TTI, the specific processing time is configured as a multiple of the first processing time.

7. The method of claim 1, wherein when a length of the second TTI is longer than a length of the first TTI, the specific processing time is configured as a multiple of the second processing time.

8. The method of claim 1,
   wherein when a length of the first TTI is smaller than a length of the second TTI, the specific processing time is configured as a sum of a multiple of the first processing time and a third processing time, and
   wherein the third processing time is a processing time for uplink control information.

9. The method of claim 1,
   wherein the first processing time includes a time for receiving and decoding the downlink control channel, and
   wherein the second processing time includes a time for encoding the specific uplink control channel and a time corresponding to a timing advance.

10. The method of claim 1, wherein the specific uplink channel comprises an uplink data channel for transmission or retransmission of uplink data.

11. A user equipment configure for transmitting and receiving data in a wireless communication system supporting a short transmission time interval (TTI), the user equipment comprising:
    a transceiver configured to transmit and receive radio signals; and
    a processor functionally connected to the transceiver, wherein the processor is configured to:
    receive a downlink control channel configured as a first TTI, and
    transmit a specific uplink channel configured as a second TTI based on the received downlink control channel,
    wherein the first TTI and the second TTI are configured as TTIs of different lengths,
    wherein the specific uplink channel is transmitted through a subframe after a specific processing time from a time when a resource region allocated to the downlink control channel is terminated,
    wherein the specific processing time is configured based on at least one of a first processing time for the downlink control channel or a second processing time for the specific uplink control channel,
    wherein the first processing time is configured based on the first TTI,
    wherein the second processing time is configured based on the second TTI,
    wherein the first processing time is configured as a multiple of a length unit of a downlink subframe configured according to the first TTI, and
    the second processing time is configured as a multiple of a length unit of an uplink subframe configured according to the second TTI.

12. The user equipment of claim 11, wherein the processor is further configured to receive configuration information related to at least one of the first processing time or the second processing time, through higher layer signaling.

* * * * *